United States Patent
Ishida et al.

(10) Patent No.: US 10,926,700 B2
(45) Date of Patent: Feb. 23, 2021

(54) IMAGE PROCESSING DEVICE

(71) Applicant: DENSO CORPORATION, Kariya (JP)

(72) Inventors: Hiroshi Ishida, Kariya (JP); Kenji Okano, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 16/339,613

(22) PCT Filed: Oct. 2, 2017

(86) PCT No.: PCT/JP2017/035816
§ 371 (c)(1),
(2) Date: Apr. 4, 2019

(87) PCT Pub. No.: WO2018/066510
PCT Pub. Date: Apr. 12, 2018

(65) Prior Publication Data
US 2020/0039437 A1    Feb. 6, 2020

(30) Foreign Application Priority Data

Oct. 7, 2016   (JP) .............................. JP2016-199184

(51) Int. Cl.
| | |
|---|---|
| *G06K 9/00* | (2006.01) |
| *B60R 1/00* | (2006.01) |
| *G06T 11/20* | (2006.01) |
| *G08G 1/16* | (2006.01) |

(52) U.S. Cl.
CPC .............. *B60R 1/00* (2013.01); *G06T 11/20* (2013.01); *G08G 1/167* (2013.01); *B60R 2300/308* (2013.01); *B60R 2300/607* (2013.01); *B60R 2300/804* (2013.01); *G06T 2207/30256* (2013.01)

(58) Field of Classification Search
CPC ............... B60R 1/00; B60R 2300/308; B60R 2300/607; B60R 2300/804; G06T 11/20; G08G 1/167
USPC ....................................................... 382/104
See application file for complete search history.

(56) References Cited

U.S. PATENT DOCUMENTS

| | | | | |
|---|---|---|---|---|
| 2005/0232469 A1* | 10/2005 | Schofield | .............. | B60W 30/18 |
| | | | | 382/104 |
| 2007/0013495 A1* | 1/2007 | Suzuki | .................. | G09G 5/026 |
| | | | | 340/435 |
| 2007/0139176 A1* | 6/2007 | Victor | .................. | B62D 15/029 |
| | | | | 340/435 |

FOREIGN PATENT DOCUMENTS

| | | |
|---|---|---|
| JP | 2003-006621 A | 1/2003 |
| JP | 2006-350617 A | 12/2006 |
| JP | 2007-512636 A | 5/2007 |

* cited by examiner

*Primary Examiner* — Stephen P Coleman
(74) *Attorney, Agent, or Firm* — Maschoff Brennan (57) ABSTRACT

An image processing device includes an image acquiring unit, a detection unit, and a display processing unit. The image acquiring unit is configured to acquire a captured image from an image capturing device configured to capture an image of the periphery of a vehicle. The detection unit is configured to detect a lane marker defining a traveling track of the vehicle from the captured image acquired by the image acquiring unit. The display processing unit is configured to display, on a display device, a superimposition image as the captured image on which a marker image for supporting visibility of the lane marker is superimposed such that the marker image is superimposed on the lane marker detected by the detection unit.

15 Claims, 12 Drawing Sheets

IMAGE PROCESSING DEVICE

CROSS-REFERENCE TO RELATED APPLICATION

This application is the U.S. national phase of International Application No. PCT/JP2017/035816 filed Oct. 2, 2017 which designated the U.S. and claims priority to Japanese Patent Applications No. 2016-199184 filed Oct. 7, 2016, the contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an image processing device.

BACKGROUND ART

A device configured to process a captured image acquired from an image capturing device to display the image for easily grasping a positional relationship between a vehicle and a white line has been known. For example, Patent Literature 1 discloses the following technique. First, a captured back image from a back camera is converted into a rear bird's-eye image. Next, a positional relationship between the rear bird's-eye image and the vehicle is shifted such that the converted rear bird's-eye image moves to the front of the vehicle, and an estimated bird's-eye image indicating estimated lateral and front sides of the vehicle is produced. That is, the estimated bird's-eye image is produced assuming that a white line included in the rear bird's-eye image is similarly continued to the lateral and front sides of the vehicle. With this technique, the estimated bird's-eye image is, together with an image indicating the position of the own vehicle, specifically displayed on, e.g., a monitor upon forward movement of the vehicle, and therefore, the position of the vehicle with respect to the white line can be easily grasped.

CITATION LIST

Patent Literature

SUMMARY OF THE INVENTION

In Patent Literature 1, in a case where a white line on a road is, for example, missing or is unclear during the night, the white line included in the rear bird's-eye image is also missing or is unclear. For this reason, in the estimated bird's-eye image produced from the rear bird's-eye image, the image of the white line is also missing or is unclear. Thus, as a result of close examination by an inventor, a problem that even when a driver views the monitor on which the estimated bird's-eye image is displayed, the driver has a difficulty in viewing the white line and grasping the positional relationship between the vehicle and the white line has been found.

One object of the present disclosure is to provide an image processing device configured so that a driver can easily grasp a positional relationship between a vehicle and a lane marker defining a traveling track of the vehicle.

One aspect of the present disclosure is an image processing device including an image acquiring unit, a detection unit, and a display processing unit. The image acquiring unit is configured to acquire a captured image from an image capturing device configured to capture an image of the periphery of a vehicle. The detection unit is configured to detect a lane marker defining a traveling track of the vehicle from the captured image acquired by the image acquiring unit. The display processing unit is configured to display, on a display device, a superimposed image as the captured image on which a marker image for supporting visibility of the lane marker is superimposed such that the marker image is superimposed on the lane marker detected by the detection unit.

According to the image processing device of the present disclosure, the superimposition image is displayed on the display device, and therefore, a driver easily grasps a positional relationship between the own vehicle and the lane marker. Moreover, even in a case where the lane marker is, for example, partially missing or is unclear during the night, the marker image complements the lane marker, and therefore, the driver easily views the lane marker.

Note that reference numerals in parentheses as described in the claims indicate a correspondence with specific sections described in an embodiment described later as one aspect, and are not intended to limit the technical scope of the present disclosure.

DESCRIPTION OF THE EMBODIMENTS

Hereinafter, embodiments for carrying out the present disclosure will be described with reference to the drawings.

1. First Embodiment

[1-1. Configuration of Image Processing Device 1]

Figure 1:
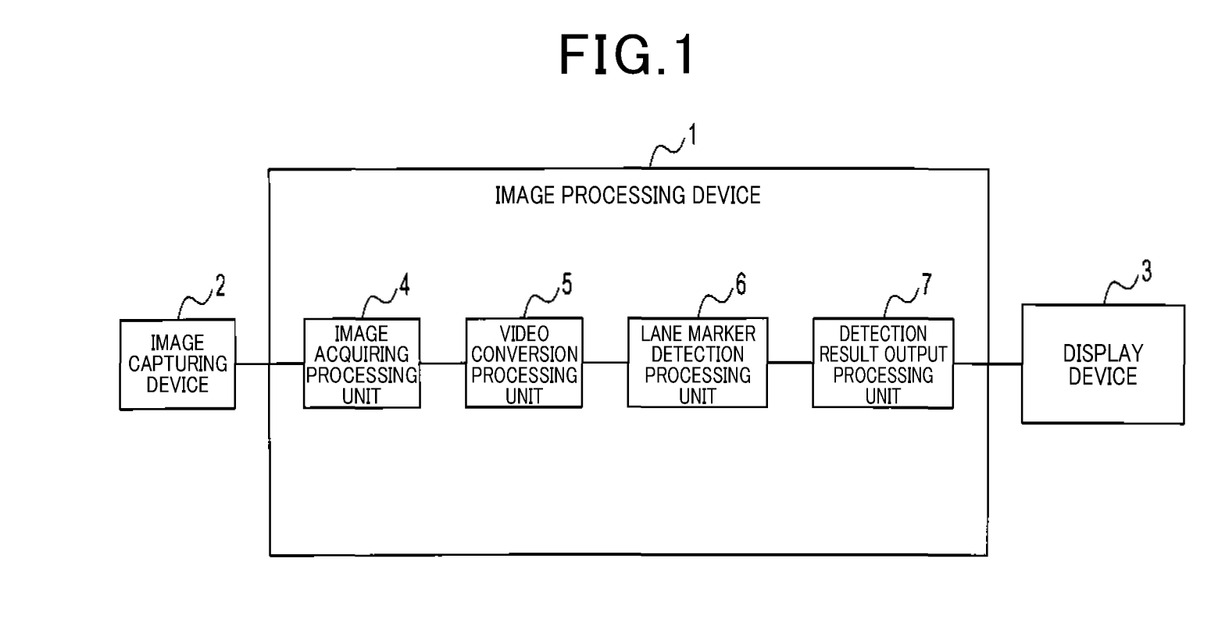
FIG. 1 is a block diagram of a configuration of an image processing device.

A configuration of an image processing device 1 will be described based on FIG. 1. The image processing device 1 is an in-vehicle device mounted on a vehicle. The vehicle on which the image processing device 1 is mounted will be hereinafter referred to as an "own vehicle." The image processing device 1 is an ECU, and an image capturing device 2 and a display device 3 are connected to the image processing device 1. Note that the ECU stands for "Electronic Control Unit," i.e., an electronic control device.

The image capturing device 2 includes a front camera, a left side camera, a right side camera, and a rear camera. The front camera is placed at the own vehicle such that a road surface in the front of the own vehicle is an image capturing area. The left side camera is placed at the own vehicle such that a road surface on the left of the own vehicle is an image capturing area. The right side camera is placed at the own vehicle such that a road surface on the right of the own vehicle is an image capturing area. The rear side camera is placed at the own vehicle such that a road surface in the rear of the own vehicle is an image capturing area. Each camera is configured to repeatedly capture an image at a preset time interval such as an interval of 1/15 seconds, thereby outputting the captured image to the image processing device 1.

The display device 3 is a display device having a display screen of, e.g., liquid crystal or organic EL. The display device is configured to display an image according to a signal input from the image processing device 1.

The image processing device 1 mainly includes a well-known microcomputer having a CPU, a RAM, a ROM, a semiconductor memory such as a flash memory, etc. Various functions of the image processing device 1 are implemented in such a manner that the CPU executes programs stored in a non-transitory tangible recording medium. In this example, the semiconductor memory is equivalent to the non-transitory tangible recording medium storing the programs. Moreover, by execution of the program, a method corresponding to the program is executed. Note that the number of microcomputers forming the image processing device 1 may be one or more.

The image processing device 1 includes, as functional configurations implemented by execution of the programs by the CPU, an image acquiring processing unit 4, a video conversion processing unit 5, a lane marker detection processing unit 6, and a detection result output processing unit 7. The method for implementing these elements forming the image processing device 1 is not limited to software, and some or all of the elements may be implemented using hardware combined with a logic circuit, an analog circuit, etc.

[1-2. Image Processing]

Image processing executed by the image processing device 1 will be described with reference to flowcharts of FIGS. 2 and 3. The image processing is executed at a predetermined time interval such as 1/15 seconds during a period in which an ignition switch of the own vehicle is ON.

Figure 2:
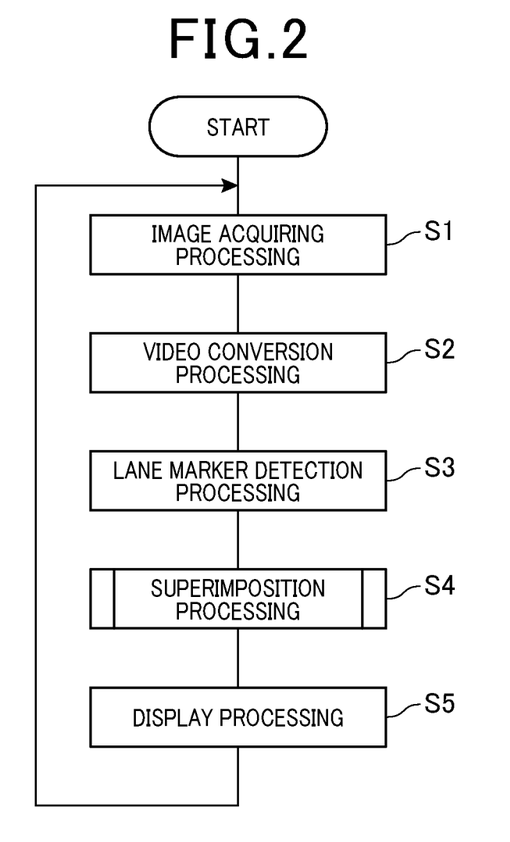
FIG. 2 is a flowchart of image processing of a first embodiment.
Figure 3:
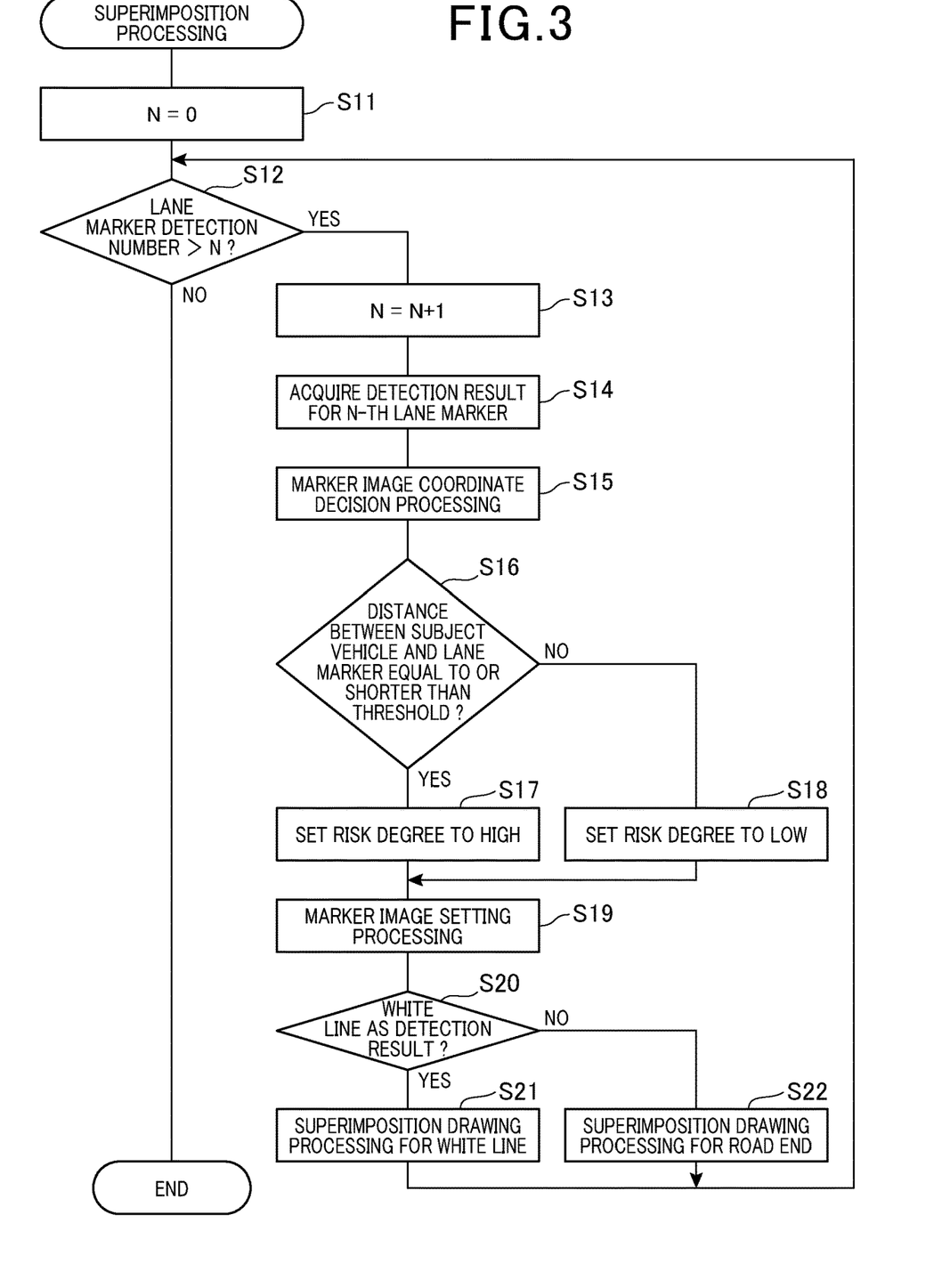
FIG. 3 is a flowchart of superimposition processing of the first embodiment.

As illustrated in FIG. 2, the image processing device 1 performs, at Step 1, the processing of acquiring captured images from the front camera, the left side camera, the right side camera, and the rear camera to convert the captured images into digital signals. Note that the image processing device 1 executes the processing of Step 1 to function as the image acquiring processing unit 4.

At subsequent Step 2, the image processing device 1 performs the processing of converting the four captured images as the digital signals into bird's-eye images viewed from a preset virtual view point to synthesize these images, thereby generating a bird's-eye image of the periphery of the own vehicle. Specifically, the image processing device 1 performs the processing of performing well-known bird's-eye conversion for the four captured images to convert the captured images into the bird's-eye images as images viewed from above the own vehicle, thereby synthesizing the bird's-eye images. Note that the image processing device 1 executes the processing of Step 2 to function as the video conversion processing unit 5.

At subsequent Step 3, the image processing device 1 performs the processing of detecting a lane marker 30 from the bird's-eye image generated at Step 2. The lane marker 30 described herein is for defining a traveling track of the own vehicle. At Step 3, a white line marked on the road surface and defining the traveling track and a road end as a boundary between a road and a sidewalk are mainly detected as the lane markers 30. The white line includes, for example, a continuous line and a dashed line. The road end includes, for example, a curb, a side gutter, and a guardrail. For example, two white lines are detected as the lane markers 30 from bird's-eye images illustrated in FIGS. 4 and 6.

Detection of the lane marker 30 can be performed using a well-known technique. For example, detection of the white line can be performed in such a manner that brightness in the bird's-eye image is calculated and an edge is extracted from the image subjected to brightness conversion. Detection of the road end can be performed using information such as the brightness, color, or shape of the bird's-eye image. Note that the image processing device 1 executes the processing of Step 3 to function as the lane marker detection processing unit 6.

Figure 4:
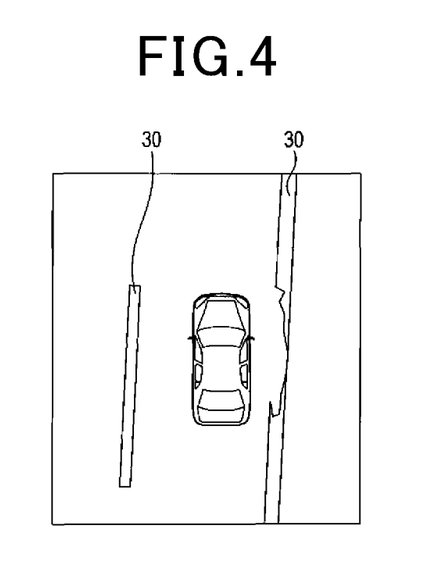
FIG. 4 is a bird's-eye image showing a state in which a white line is partially missing.
Figure 5:
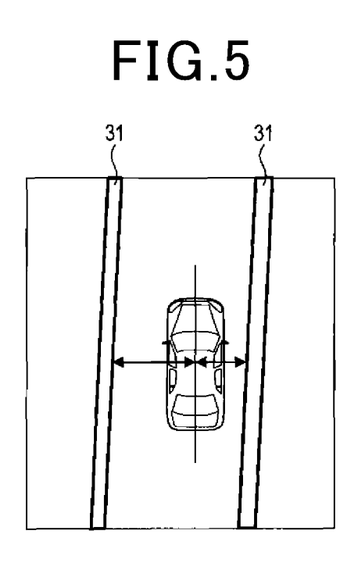
FIG. 5 is a superimposition image after the image processing of the first embodiment has been performed for the bird's-eye image illustrated in FIG. 4.
Figure 6:
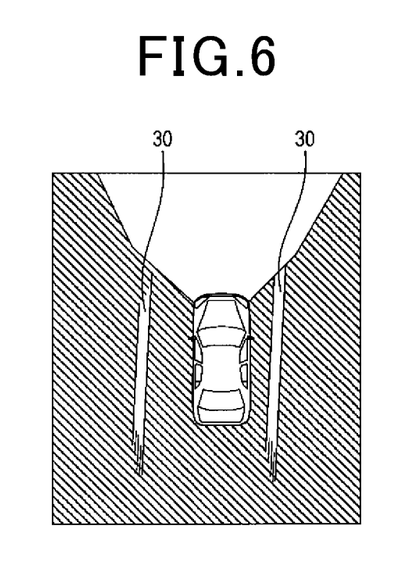
FIG. 6 is a view showing a state in which white lines are unclear during the night.
Figure 7:
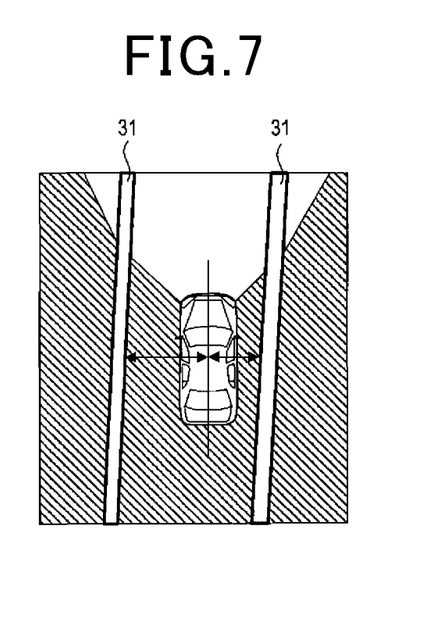
FIG. 7 is a superimposition image after the image processing of the first embodiment has been performed for the bird's-eye image illustrated in FIG. 6.

At subsequent Step 4, the image processing device 1 performs the superimposition processing of superimposing a marker image 31 for supporting visibility of the lane marker 30 detected at Step 3 on the lane marker 30. Specifically, as illustrated in, e.g., FIGS. 5 and 7, the marker image 31 is a band-shaped image for clearly showing the lane marker 30. FIG. 5 is a superimposition image in which two marker images 31 are superimposed on two white lines on the bird's-eye image illustrated in FIG. 4. As illustrated in FIG. 5, the marker images 31 are band-shaped images arranged to overlap with the lane markers 30 on the bird's-eye image and extending from an end to another end on the bird's-eye image. Thus, even in a case where the lane marker 30 is missing as illustrated in FIG. 4, such a marker image 31 is superimposed so that the position of the lane marker 30 can be clearly indicated. Moreover, FIG. 7 is a superimposition image in which two marker images 31 are superimposed on two white lines on the bird's-eye image illustrated in FIG. 6 Even in a case the lane markers 30 are unclear during the night as illustrated in FIG. 6, the marker images 31 are superimposed so that the positions of the lane markers 30 can be clearly indicated.

Specific processing in the superimposition processing will be described with reference to the flowchart of FIG. 3.

At Step 11, the image processing device 1 performs the processing of setting a default value for a variable N to zero. N is a natural number.

At subsequent Step 12, the image processing device 1 performs the processing of determining whether the number of detections of the lane markers 30 detected at Step 3 is greater than the variable N or not. When positive determination is made at Step 12, the processing proceeds to Step 13. At Step 13, the image processing device 1 performs the processing of adding one to the variable N.

At subsequent Step 14, the image processing device 1 performs the processing of acquiring, from the bird's-eye image, a distance from the own vehicle to the N-th lane marker 30 detected at Step 3 and the inclination of the N-th lane marker 30 based on the N-th lane marker 30. Note that the distance from the own vehicle to the lane marker 30 is a distance from the own vehicle to a line, which indicates a longitudinal direction, of the band-shaped lane marker 30 close to the own vehicle.

At subsequent Step 15, the image processing device 1 performs the processing of deciding, based on a result acquired at Step 14, the coordinate position of the marker image 31 superimposed on the N-th lane marker 30. Specifically, the image processing device 1 performs the processing of deciding the position of a line, which indicates a longitudinal direction, of the band-shaped marker image 31 close to the own vehicle. Note that this line extends from an end to another end on the bird's-eye image.

At subsequent Step 16, the image processing device 1 performs the processing of determining whether the distance from the own vehicle to the N-th lane marker 30 is equal to or shorter than a threshold or not. When positive determination is made at Step 16, the image processing device 1 performs, at Step 17, the processing of setting the degree of risk to high. When negative determination is made at Step 16, the image processing device 1 performs, at Step 18, the processing of setting the degree of risk to low. Note that the processing at Steps 16, 17, and 18 will be referred to as "risk degree decision processing."

After Step 17 or Step 18, the processing proceeds to Step 19. At Step 19, the image processing device 1 performs the processing of setting the width of the marker image 31 according to the degree of risk set at Step 17 or Step 18. Specifically, the image processing device 1 sets the display form of the marker image 31 such that the width of the marker image 31 is broadened in the case of a high degree of risk, and sets the display form of the marker image 31 such that the width of the marker image 31 is narrowed in the case of a low degree of risk. Note that the image processing device 1 performs the processing of deciding a distance from the position of the line of the marker image 31 decided at Step 15 to a side farther from the own vehicle, thereby setting the degree of width of the marker image 31.

At subsequent Step 20, the image processing device 1 performs the processing of determining whether the N-th lane marker 30 detected at Step 3 is the white line or not. When positive determination is made at Step 20, the processing of drawing the linear marker image 31 indicating the white line on the bird's-eye image is performed at Step 21. When negative determination is made at Step 20, the processing of drawing the three-dimensional marker image 31 indicating the road end on the bird's-eye image is performed at Step 22. Note that the processing at Steps 20, 21, and 22 will be referred to as "superimposition drawing processing."

After Step 21 or Step 22, the processing returns to Step 12. The processing of Steps 13 to 22 is performed while positive determination is made at Step 12, and the superimposition processing ends when negative determination is made at Step 12.

After Step 4, the processing proceeds to Step 5. At Step 5, the image processing device 1 performs the processing of outputting, to the display device 3, the superimposition image on which the marker images 31 are superimposed at Step 4. Note that the image processing device 1 executes the processing at Steps 4 and 5 to function as the detection result output processing unit 7.

After Step 5, the processing returns to Step 1, and the image processing device 1 performs the image processing for a subsequently-acquired captured image. The image processing device 1 ends the image processing when the ignition switch is turned OFF.

[1-3. Advantageous Effects]

According to the first embodiment described above in detail, the following advantageous effects are obtained.

(1a) The image processing device 1 of the first embodiment performs the processing of displaying, on the display device 3, the superimposition image on which the marker image 31 is superimposed. Thus, the position of the lane marker 30 can be clearly indicated. Consequently, a driver can easily grasp a positional relationship between the own vehicle and the lane marker 30. For example, even in a case where the lane marker 30 is partially missing or is unclear during the night, the marker image 31 complements the lane marker 30, and therefore, the driver easily views the lane marker 30.

(b1) The image processing device 1 of the first embodiment performs the processing of deciding the display form of the marker image 31. Thus, the display form of the marker image 31 can be changed. Consequently, the superimposition image on which the marker image 31 in an optional display form is superimposed can be displayed on the display device 3.

(1c) The image processing device 1 of the first embodiment performs the processing of changing the width of the marker image according to the degree of risk. Thus, the driver can recognize the degree of risk. Consequently, the driver can grasp the position of the own vehicle in a width direction of the traveling track.

(1d) The image processing device 1 of the first embodiment performs the processing of broadening the width of the marker image 31 in the case of a high degree of risk. Thus, in the case of a high degree of risk, the marker image 31 can be displayed with emphasis. Consequently, the driver easily recognizes that the degree of risk is high, i.e., the own vehicle is about to deviate from the traveling track.

(1e) The image processing device 1 of the first embodiment performs the processing of changing the display form of the marker image 31 according to the white line or the road end. Thus, even when the marker image 31 is superimposed to hide the lane marker 30 on the superimposition image, the driver can recognize the type of lane marker 30.

Note that in the first embodiment, S1 is equivalent to processing as an image acquiring unit, S3 is equivalent to processing as a detection unit, S11 to S15 and S5 are equivalent to processing as a display processing unit, and S16 to S22 are equivalent to processing as a decision unit.

2. Second Embodiment

[2-1. Differences from First Embodiment]

A basic configuration of a second embodiment is similar to that of the first embodiment, and therefore, differences will be described below. Note that the same reference numerals as those of the first embodiment indicate equivalent configurations, and previous description is referred to.

In the above-described first embodiment, the image processing device 1 performs the processing of displaying, on the display device 3, the marker images 31 superimposed on all of the detected lane markers 30. On the other hand, in the second embodiment, when an image processing device 1 determines that an own vehicle is in a lane change state, the image processing device 1 performs the processing of not displaying a marker image 31 superimposed on a lane marker 30 assumed that the own vehicle moves over upon a lane change.

[2-2. Image Processing]

Figure 8:
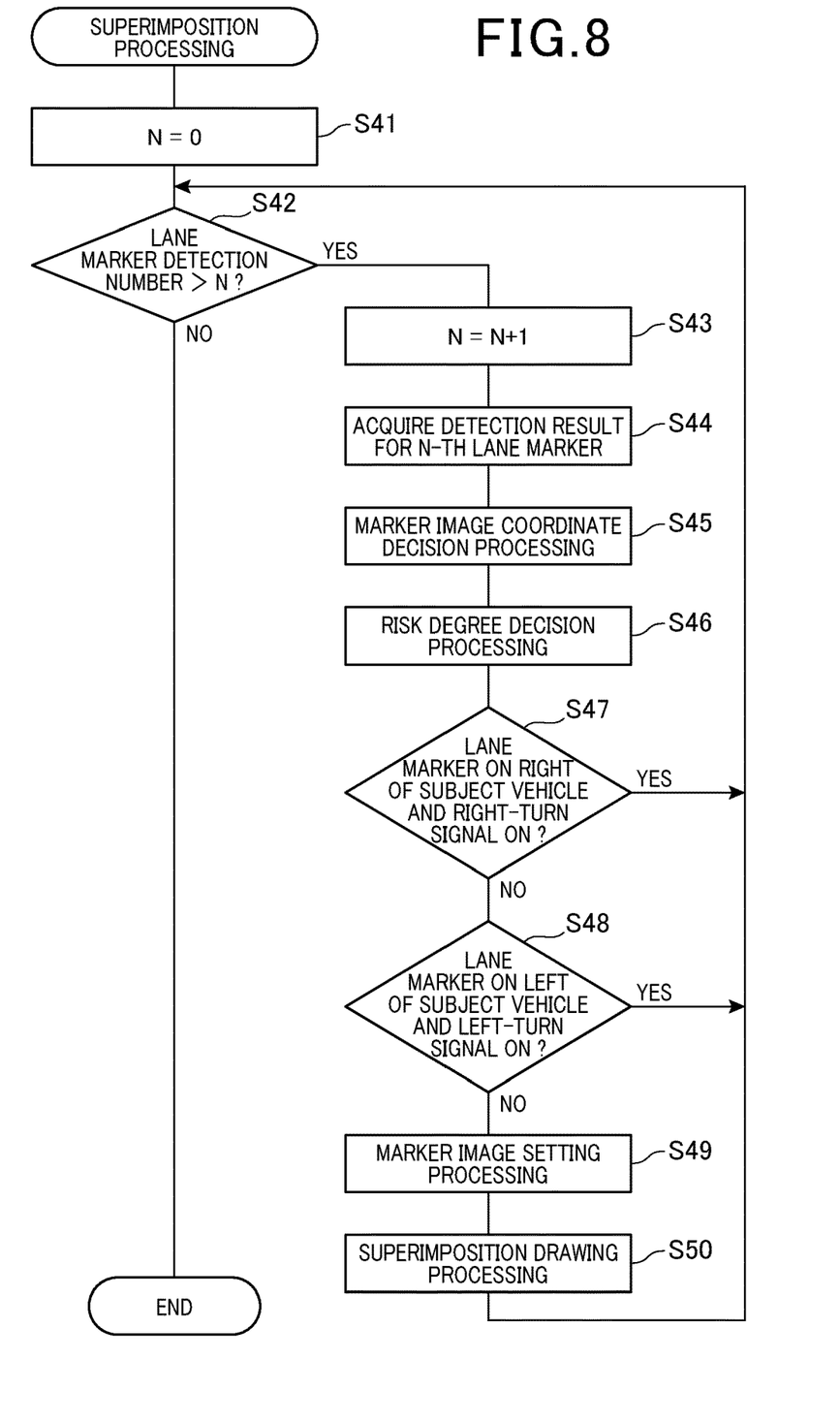
FIG. 8 is a flowchart of superimposition processing of a second embodiment.

Superimposition processing executed by the image processing device 1 of the second embodiment instead of the superimposition processing of the first embodiment illustrated in FIG. 3 will be described with reference to a flowchart of FIG. 8. Note that processing at steps 41 to 45 in FIG. 8 is similar to that at Steps 11 to 15 in FIG. 3, and therefore, description thereof will be partially simplified.

After Step 45, the processing proceeds to Step 46. At Step 46, the image processing device 1 performs risk degree decision processing. The risk degree decision processing is similar to the processing at Steps 16, 17, and 18 in FIG. 3.

Figure 9:
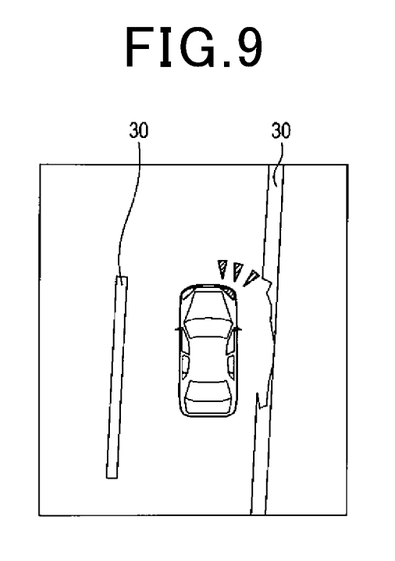
FIG. 9 is a view showing a state in which a white line is partially missing and an own vehicle is about to move to a right lane.
Figure 10:
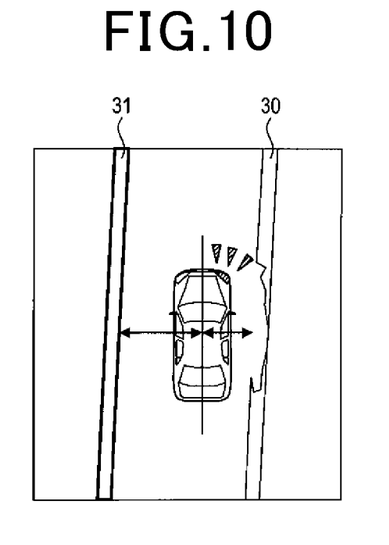
FIG. 10 is a view after image processing of the second embodiment has been performed in a case where the white line is partially missing and the own vehicle is about to move to the right lane.
Figure 11:
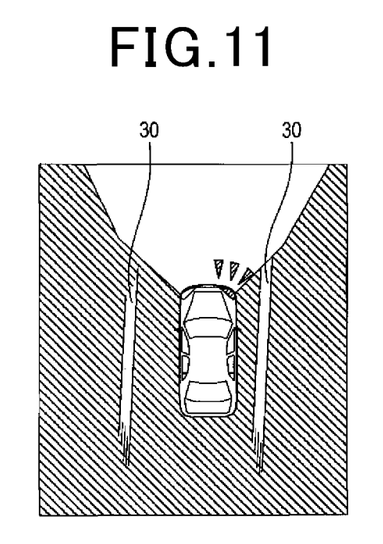
FIG. 11 is a view showing a state in which white lines are unclear during the night and the own vehicle is about to move to the right lane.
Figure 12:
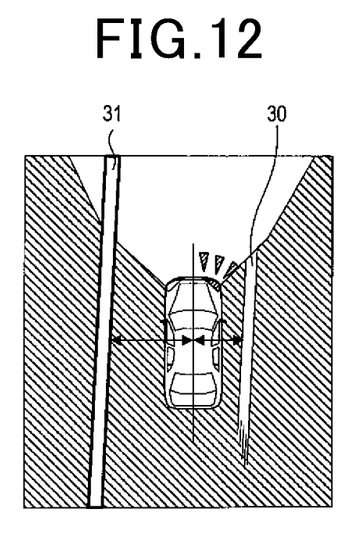
FIG. 12 is a view after the image processing of the second embodiment has been performed in a case where the white lines are unclear during the night and the own vehicle is about to move to the right lane.

At subsequent Step 47, the image processing device 1 determines whether the position of the N-th lane marker 30 detected at Step 3 is present on the right of the own vehicle and a right-turn signal is ON or not. When positive determination is made at Step 47, the processing returns to Step 42. For example, as illustrated in FIGS. 9 and 11, in a case where the position of a white line is present on the right of the own vehicle and the right-turn signal is ON, i.e., a case where the own vehicle is about to move to a right lane, no marker image 31 is superimposed on such a white line as illustrated in FIGS. 10 and 12. When negative determination is made at Step 47, the processing proceeds to Step 48.

At Step 48, the image processing device 1 determines whether the position of the N-th lane marker 30 detected at Step 3 is present on the left of the own vehicle and a left-turn signal is ON or not. When positive determination is made at Step 48, the processing returns to Step 42. That is, when it is determined that the own vehicle is about to move to a left lane, no marker image 31 is superimposed on the lane marker 30. When negative determination is made at Step 48, the processing proceeds to Step 49. Note that the processing at Steps 47 and 48 will be referred to as "non-display decision processing."

At Step 49, the image processing device 1 performs the processing of setting the width of the marker image 31 according to the degree of risk set at Step 46.

At subsequent Step 50, the image processing device 1 performs superimposition drawing processing. The superimposition drawing processing is similar to the processing at Steps 20, 21, and 22 in FIG. 3.

After Step 50, the processing returns to Step 42. When negative determination is made at Step 42, the superimposition processing ends.

[2-3. Advantageous Effects]

According to the second embodiment described above in detail, the advantageous effects of the above-described first embodiment are provided, and the following advantageous effects are further provided.

(2a) The image processing device 1 of the second embodiment performs the non-display decision processing. Thus, the marker image 31 superimposed on the lane marker 30 assumed that the own vehicle moves over upon the lane change is not displayed on the display device 3. When the marker image 31 is displayed upon the lane change, a driver feels a difficulty in lane change, but can smoothly change lane because no marker image 31 is displayed. Moreover, when the marker image 31 is displayed upon the lane change, the marker image 31 indicating a high degree of risk is displayed in association with the lane change, but it is not necessary to actively notify information indicating a high degree of risk to the driver because no marker image 31 is displayed.

Note that in the second embodiment, S41 to S45 are equivalent to processing as a display processing unit, S46, S49, and S50 are equivalent to processing as a decision unit, and S47 and S48 are equivalent to processing as a determination unit.

3. Other Embodiments

The embodiments of the present disclosure have been described above, but various modifications can be made to the present disclosure without limitations to the above-described embodiments.

(3a) In the above-described embodiments, the example where the image processing is performed for the bird's-eye image as an image processing target has been described, but the image processing target is not limited to above; and the image processing may be performed for the captured image.

(3b) In the above-described embodiments, the example where the image processing device 1 performs the processing of setting the width of the marker image 31 according to the degree of risk has been described, but setting of the display form of the marker image is not limited to above. The display form of the marker image includes, for example, the color, transmittance, and blinking rate of the marker image. Specifically, when the degree of risk is increased, the color of the marker image may turn red in Stepwise manner, the transmittance of the marker image may be decreased, or the blinking rate of the marker image may be increased.

(3c) In the above-described embodiments, the example where the processing of changing the display form of the marker image 31 according to whether the lane marker 30 is the white line or the road end is performed as the superimposition drawing processing has been described, but the superimposition drawing processing is not limited to above. The superimposition drawing processing may be the processing of changing the display form of the marker image according to the type of white line or road end. For example, in a case where the white line is the dashed line, the marker image may be a dashed line.

(3d) In the above-described embodiments, the example where setting of the degree of risk according to the distance between the own vehicle and the lane marker 30 is performed as the risk degree decision processing has been described, but the risk degree decision processing is not limited to above. The risk degree decision processing may set the degree of risk according to the type of lane marker. For example, the degree of risk may be set to low in a case where the lane change is allowed as indicated by a line such as a dashed line, and may be set to high in a case where the lane change is not allowed as indicated by, e.g., a line in the color of yellow.

(3e) The image processing device 1 of the above-described embodiments may determine the brightness of the bird's-eye image, thereby changing the marker image to an optimal brightness according to the determined brightness. For example, the marker image is set to the same degree of brightness as that of the bird's-eye image. With this configuration, the superimposition image with a less brightness difference is displayed on the display device, and therefore, the superimposition image friendly to the eyes of the driver can be provided.

(3f) In the above-described embodiments, the example where the image processing is performed for the entirety of the bird's-eye image as an image processing area has been described, but the image processing area is not limited to above. The image processing area may be, for example, a portion of the bird's-eye image close to the vehicle. With this configuration, processing time is reduced as compared to the case of performing the image processing for the entirety of the bird's-eye image.

(3g) In the above-described embodiments, the example where four cameras including the front camera, the left side camera, the right side camera, and the rear camera are used as the image capturing device 2 has been described, but the image capturing device is not limited to the above; and one or more cameras may be used.

(3h) Multiple functions included in a single component in the above-described embodiments may be implemented by multiple components, or a single function included in a single component may be implemented by multiple components. Alternatively, multiple functions included in multiple components may be implemented by a single component, and a single function implemented by multiple components may be implemented by a single component. Moreover, some of the configurations of the above-described embodiments may be omitted. Further, at least some of the configurations of the above-described embodiments may be added to or replaced with other configurations of the above-described embodiments. Note that any forms included in the technical idea identified from wording in the claims are embodiments of the present disclosure.

(3i) In addition to the above-described image processing device 1, the present disclosure can be implemented in various forms such as a system including, as a component, the image processing device 1, a program for causing a computer to execute the above-described image processing, a non-transitory tangible recording medium such as a semiconductor memory recording the program, and an image processing method.

The invention claimed is:

1. An image processing device comprising:
   an image acquiring unit configured to acquire a captured image from an image capturing device configured to capture an image of a periphery of a vehicle;
   a detection unit configured to detect a lane marker defining a traveling track of the vehicle from the captured image acquired by the image acquiring unit;
   a display processing unit configured to display, on a display device, a superimposition image as the captured image on which a marker image for supporting visibility of the lane marker is superimposed such that the marker image is superimposed on the lane marker detected by the detection unit, and
   a determination unit configured to determine whether the vehicle is in a lane change state or not, wherein
   in a case where the determination unit determines that the vehicle is in the lane change state, the display processing unit is configured not to display the marker image to be superimposed on the lane marker which is predicted to be crossed by a lane change.

2. The image processing device according to claim 1, further comprising:
   a decision unit configured to decide a display form of the marker image,
   wherein the display processing unit is configured to display, on the display device, the superimposition image based on the display form decided by the decision unit.

3. The image processing device according to claim 2, wherein
   the decision unit is configured to change the display form of the marker image according to a type of lane marker detected by the detection unit.

4. The image processing device according to claim 2, wherein
   the decision unit is configured to calculate a distance between the vehicle and the lane marker, thereby changing the display form of the marker image according to the calculated distance.

5. The image processing device according to claim 4, wherein
   the decision unit is configured to change the display form of the marker image such that a width of the marker image in a case where the calculated distance is equal to or shorter than a certain value is greater than that of the marker image in a case where the calculated distance is not equal to or shorter than the certain value.

6. A computer-implemented method for performing image processing by a vehicle equipped with a camera and a display, the camera capturing images of a periphery of the vehicle, the computer-implemented method comprising:
   acquiring a captured image from the camera;
   detecting a lane marker that defines a traveling track of the vehicle from the captured image;
   displaying, on the display, a superimposition image as the captured image on which a marker image that supports visibility of the lane marker is superimposed such that the marker image is superimposed on the lane marker; and
   determining whether the vehicle is in a lane change state or not, wherein
   in a case where the vehicle is determined to be in the lane change state, the marker image is not displayed so as to be superimposed on the lane marker, on which the vehicle would cross over upon during the lane change state.

7. The computer-implemented method according to claim 6, further comprising:
   deciding a display form of the marker image; and
   displaying, on the display, the superimposition image based on the decided display form.

8. The computer-implemented method according to claim 7, further comprising:
   changing the display form of the marker image according to a type of lane marker that is detected.

9. The computer-implemented method according to claim 7, further comprising:
   calculating a distance between the vehicle and the lane marker, which changes the display form of the marker image according to the calculated distance.

10. The computer-implemented method according to claim 9, further comprising:
    changing the display form of the marker image such that a width of the marker image in a case where the calculated distance is equal to or shorter than a certain value is greater than that of the marker image in a case where the calculated distance is not equal to or shorter than the certain value.

11. A system for performing image processing by a vehicle equipped with a camera and a display, the camera capturing images of a periphery of the vehicle, the system comprising:
    a processor;
    a non-transitory computer-readable storage medium; and
    a set of computer-executable instructions stored on the non-transitory computer-readable storage medium that cause the processor to:
    acquire a captured image from the camera;
    detecting a lane marker that defines a traveling track of the vehicle from the captured image;

display, on the display, a superimposition image as the captured image on which a marker image that supports visibility of the lane marker is superimposed such that the marker image is superimposed on the lane marker; and determine whether the vehicle is in a lane change state or not, wherein in a case where the vehicle is determined to be in the lane change state, the marker image is not displayed so as to be superimposed on the lane marker, on which the vehicle would cross over upon during the lane change state.

12. The system according to claim 11, the set of computer-executable instructions further cause the processor to:

decide a display form of the marker image; and display, on the display, the superimposition image based on the decided display form.

13. The system according to claim 12, the set of computer-executable instructions further cause the processor to: change the display form of the marker image according to a type of lane marker that is detected.

14. The system according to claim 12, the set of computer-executable instructions further cause the processor to: calculate a distance between the vehicle and the lane marker, which changes the display form of the marker image according to the calculated distance.

15. The system according to claim 14, the set of computer-executable instructions further cause the processor to: change the display form of the marker image such that a width of the marker image in a case where the calculated distance is equal to or shorter than a certain value is greater than that of the marker image in a case where the calculated distance is not equal to or shorter than the certain value.

* * * * *